United States Patent
Schipper et al.

(10) Patent No.: US 7,046,193 B2
(45) Date of Patent: May 16, 2006

(54) SOFTWARE GPS BASED INTEGRATED NAVIGATION

(75) Inventors: Brian W. Schipper, Brooklyn Park, MN (US); Charles T. Bye, Eden Prairie, MN (US)

(73) Assignee: Honeywell International Inc., Morristown, NJ (US)

( * ) Notice: Subject to any disclaimer, the term of this patent is extended or adjusted under 35 U.S.C. 154(b) by 230 days.

(21) Appl. No.: 10/720,803

(22) Filed: Nov. 24, 2003

(65) Prior Publication Data

US 2005/0110677 A1 May 26, 2005

(51) Int. Cl.
*H04B 7/185* (2006.01)

(52) U.S. Cl. .................................. 342/357.12

(58) Field of Classification Search ........... 342/357.06, 342/357.12, 357.15; 701/207, 213
See application file for complete search history.

(56) References Cited

U.S. PATENT DOCUMENTS

| 4,764,872 | A | 8/1988 | Miller |
| 5,070,458 | A | 12/1991 | Gilmore et al. |
| 5,908,176 | A | 6/1999 | Gilyard |
| 6,366,599 | B1* | 4/2002 | Carlson et al. ............. 375/130 |
| 6,856,282 | B1* | 2/2005 | Mauro et al. ........... 342/357.15 |
| 2002/0025011 | A1* | 2/2002 | Sullivan ..................... 375/343 |
| 2003/0016169 | A1* | 1/2003 | Jandrell ................. 342/357.12 |
| 2005/0163201 | A1* | 7/2005 | Krasner ..................... 375/150 |

* cited by examiner

Primary Examiner—Dao Phan
(74) Attorney, Agent, or Firm—Schiff Hardin LLP

(57) ABSTRACT

A GPS receiver acquires GPS data from at least one GPS satellite. A code offset and a frequency offset are determined based on the acquired GPS data. A change in GPS position of the GPS receiver during the determination of the code offset is determined, and a change in rate of the GPS receiver during the determination of the frequency offset is also determined. The code offset is updated based on the change in GPS position, and the frequency offset is updated based on the change in rate. The updated code offset and the updated frequency offset are handed over to a tracking function.

32 Claims, 2 Drawing Sheets

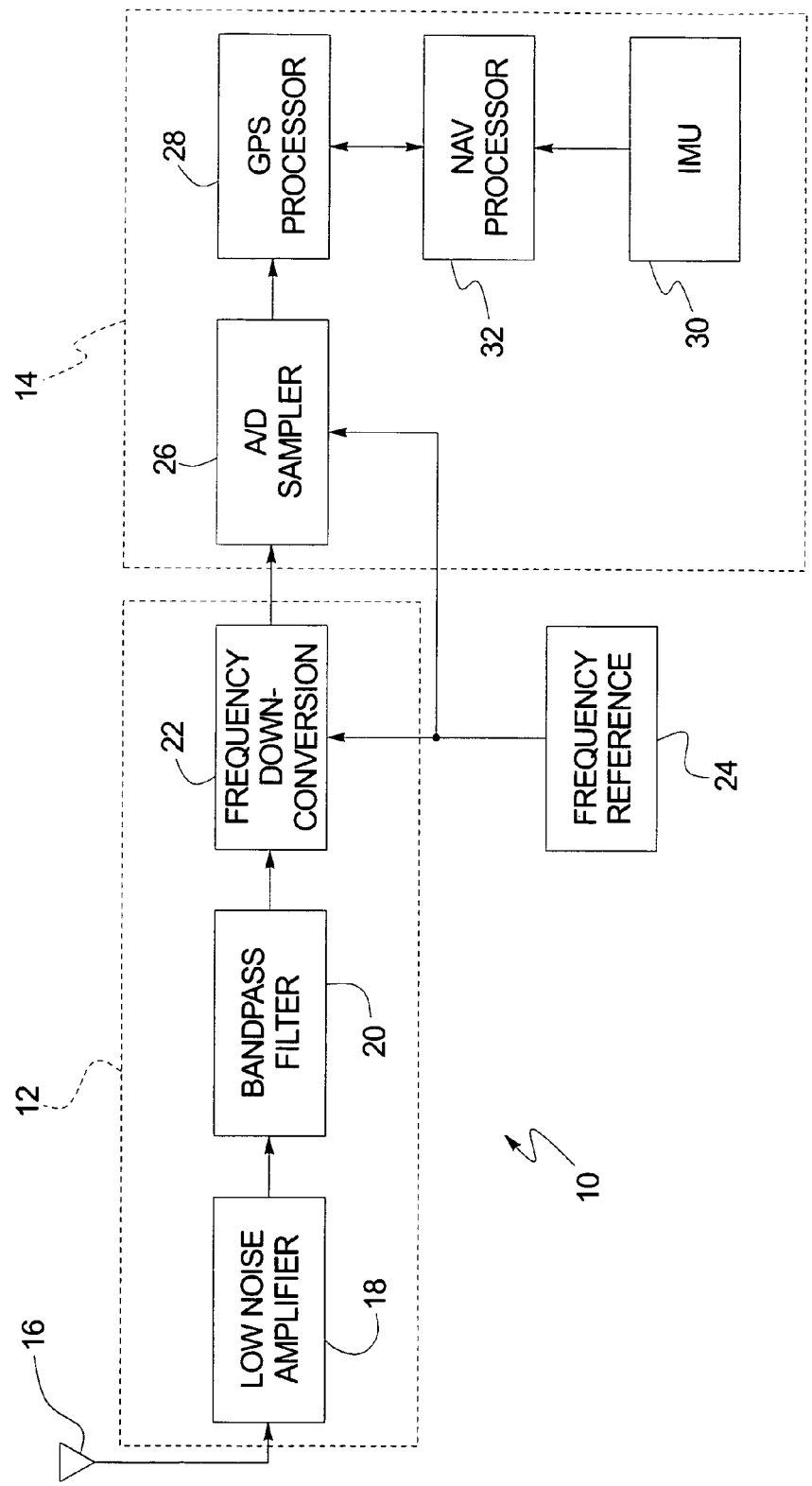

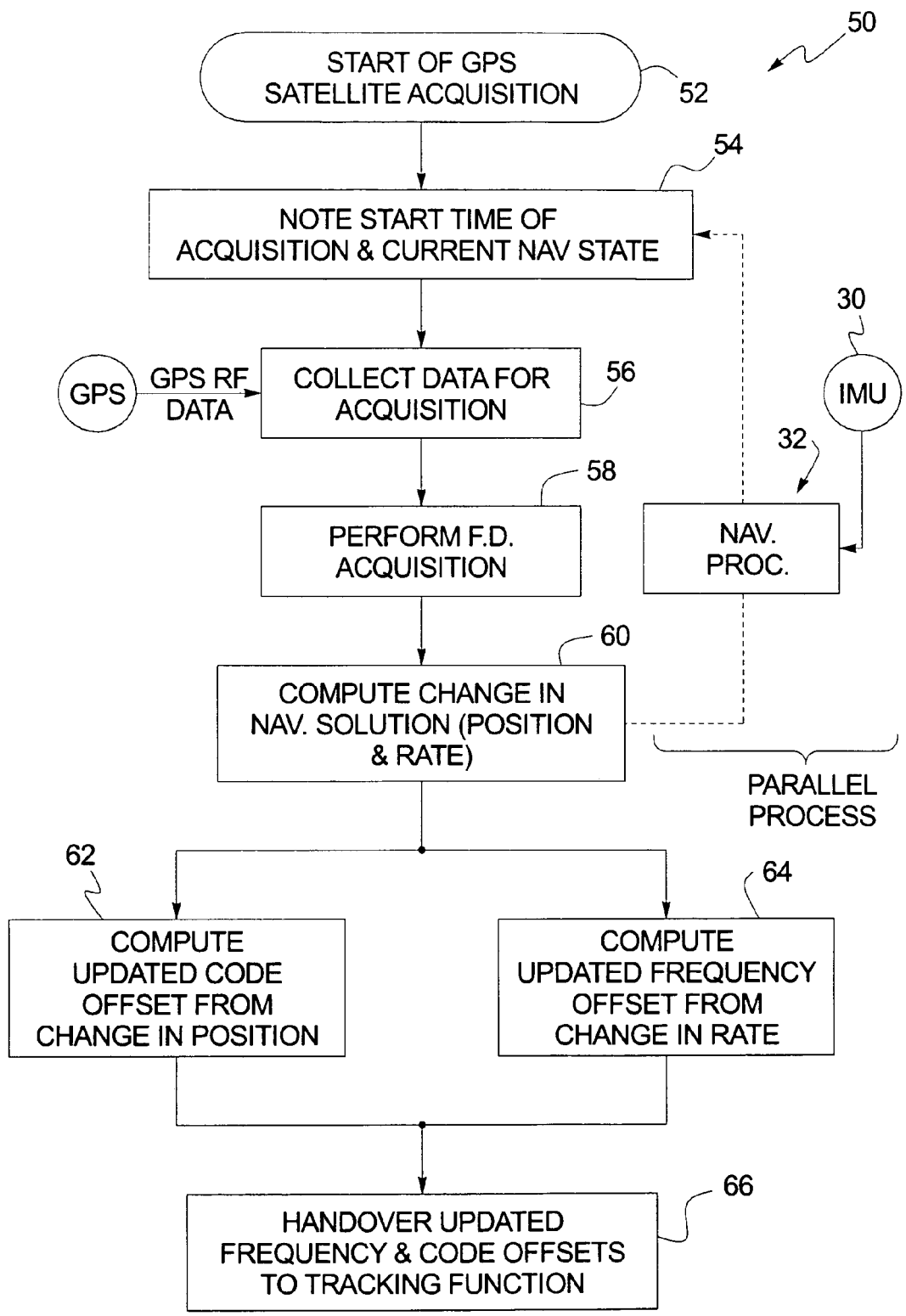

SOFTWARE GPS BASED INTEGRATED NAVIGATION

TECHNICAL FIELD OF THE INVENTION

The present invention relates to signal acquisition and tracking in a GPS system.

BACKGROUND OF THE INVENTION

The Global Positioning System (GPS) is a satellite-based navigation system developed and operated by the U.S. Department of Defense. GPS permits land, sea, and airborne users to determine their three-dimensional positions, velocities, and time.

GPS uses NAVSTAR (NAVigation Satellite Timing and Ranging) satellites. The current constellation consists of 21 operational satellites and 3 active spares. This constellation provides a GPS receiver with four to twelve useable satellites from which it can receive GPS satellite signals at any time. A minimum of four satellites allows the GPS receiver to compute its GPS position (latitude, longitude, and altitude) and GPS system time. Altitude is typically referenced to mean sea level.

The GPS satellite signal from the NAVSTAR GPS satellites contains information used to identify the satellite, as well as to provide position, timing, ranging data, satellite status, and the updated ephemeris (orbital parameters).

A worldwide system of tracking and monitoring stations measures signals from the GPS satellites and relays information from the signals to a Master Control Station. The Master Control Station uses this information to compute precise orbital models for the entire GPS constellation. This information is then formatted into updated navigation messages for each satellite.

The GPS receivers contain antennas, reception equipment, and processors that are utilized for determining position and timing based on satellite ranging.

Current designs utilize frequency-specific hardware at the front end of GPS receivers to perform signal acquisition and tracking functions. Such a GPS receiver includes a GPS front end and a system processor. The GPS front end receives the incoming analog GPS signal from a GPS antenna. This analog GPS signal is amplified by a low noise amplifier and is filtered by a bandpass filter. The low noise amplifier and the bandpass filter may be provided in multiple stages, if desired.

The analog GPS signal at the output of the bandpass filter is downconverted in a frequency downconverter by mixing the analog GPS signal with a local oscillator signal to shift the carrier frequency of the incoming analog GPS signal to a lower and more manageable frequency band. This downconversion can be performed multiple times to bring the frequency of the analog GPS signal down in steps to the final desired frequency. Each mixing operation produces a high frequency information band along with the desired lower frequency band. Accordingly, each mixing stage of the frequency downconverter requires a bandpass filter to remove the information in the higher frequency band. A frequency reference is provided for the frequency downconverter. As indicated above, the GPS front end is typically implemented in hardware.

The system processor includes an A/D sampler which, in response to the signal from the frequency reference, converts the downconverted analog GPS signal to a digital GPS signal. A GPS processor uses the downconverted digital GPS signal to first determine ranging and satellite information for the GPS satellites in the line of sight of its antenna at the time, and to then determine latitude, longitude, altitude, and/or GPS system time.

The mixing stages and band pass filters provided by the frequency downconverter comprise typical frequency specific hardware in the GPS front end of the GPS receiver. The design and development of this mixing and band pass filter hardware is an expensive part of the GPS receiver. Not only does this mixing and band pass filter hardware add recurring cost, but mixing circuit designs and re-designs add non-recurring cost whenever even a small change is made to the frequency characteristics of the system. Furthermore, this frequency-specific hardware also typically suffers from changes as a result of aging.

In order to lower cost and to reduce the effects of aging hardware, it may be desirable to remove this hardware and replace its function with software. In particular, a software solution where signal acquisition is executed with frequency domain processing and signal tracking is executed with time domain processing has shown to be a promising technique. Frequency domain processing techniques may involve Fast Fourier Transforms (FFT) for Wavelet Multiresolution Analysis (WMA). However, implementation of such a software based GPS receiver is challenging. One particular challenge encountered in designing a software based GPS receiver is in performing the handover between frequency domain acquisition and time domain tracking. This challenge arises because, if software based GPS position acquisition is done in the frequency domain with a "batch" of data, acquisition can take a non-trivial amount of time and, thus, there is a time gap between when the data used for acquisition is collected and when the acquisition solution is actually computed. Moreover, implementing signal acquisition in the frequency domain may be desirable for reasons other than reducing hardware, in which case the time required to hand over processing from acquisition to tracking is still a problem.

The present invention overcomes one or more of these or other problems.

SUMMARY OF THE INVENTION

According to one aspect of the present invention, a method performed by a GPS receiver of processing GPS data comprises the following: acquiring GPS data from at least one GPS satellite, wherein the GPS data is useful in determining GPS position of the GPS receiver; performing acquisition functions in the frequency domain based on the GPS data, wherein the acquisition functions produce acquisition results, and wherein the performing of the acquisition functions cause a delay in handing over the acquisition results to a tracking function; propagating the acquisition results forward in time by an amount of time substantially equal to the delay; and, handing over the propagated acquisition results to the tracking function.

According to another aspect of the present invention, a method performed by a GPS receiver of processing GPS data comprises the following: a) acquiring GPS data from at least one GPS satellite; b) determining a code offset based on the acquired GPS data; c) determining a frequency offset based on the acquired GPS data; d) determining a change in GPS position of the GPS receiver during the determination of the code offset; e) determining a change in rate of the GPS receiver during the determination of the frequency offset; f) determining an updated code offset based on the code offset determined at b) and the change in GPS position; g) determining an updated frequency offset based on the frequency offset determined at c) and the change in rate; and, h) handing over the updated code offset and the updated frequency offset to a tracking function.

According to yet another aspect of the present invention, a method performed by a GPS receiver of processing GPS data comprises the following: downconverting and sampling a GPS signal from at least one GPS satellite to produce digital GPS data; determining parameters related to position and rate of the GPS receiver from the digital GPS data; determining a change in the position and rate of the GPS receiver between a start of the determination of the parameters and an end of the determination of the parameters; updating the parameters in accordance with the change in the position and rate; and, handing over the updated parameters to a tracking function.

BRIEF DESCRIPTION OF THE DRAWINGS

These and other features and advantages will become more apparent from a detailed consideration of the invention when taken in conjunction with the drawings in which:

FIG. 1 illustrates a software based GPS receiver according to the present invention; and, FIG. 2 is a flow chart illustrating exemplary software executed by the GPS processor of FIG. 1.

DETAILED DESCRIPTION

As shown in FIG. 1, a GPS receiver 10 includes a GPS front end 12 and a system processor 14. The GPS front end 12 receives the incoming analog GPS signal from a GPS antenna 16. This analog GPS signal is amplified by a low noise amplifier 18 and is filtered by a bandpass filter 20. The low noise amplifier 18 and the bandpass filter 20 may be provided in multiple stages, if desired.

The analog GPS signal at the output of the bandpass filter 20 is downconverted in a frequency downconverter 22 by mixing the analog GPS signal with a local oscillator signal to shift the carrier frequency of the incoming analog GPS signal to a lower and more manageable frequency band. This downconversion can be performed multiple times to bring the frequency of the analog GPS signal down in steps to the final desired frequency. Each mixing operation produces a high frequency information band along with the lower frequency band. Therefore, each mixing stage of the frequency downconverter 22 may require a bandpass filter to remove the information in the corresponding higher frequency band. A frequency reference 24 provides a frequency reference for the frequency downconverter 22.

The system processor 14 includes an A/D sampler 26 which, in response to the signal from the frequency reference 24, converts the downconverted analog GPS signal to a digital GPS signal. A GPS processor 28 uses the downconverted digital GPS signal to first determine ranging and satellite information for the GPS satellites in view of its antenna at the time, and to then determine latitude, longitude, altitude, and/or GPS system time.

Acquisition and tracking can be performed by the GPS processor 28 in software. Acquiring and tracking the GPS signals principally means that the code and frequency offsets between satellites and receiver are determined and tracked on a regular basis. A typical value of how often the tracking loops execute is 1000 times per second. GPS position is determined from these offsets, usually at a rate of 1 Hz, but it can be done much faster if the processing capability is available in the GPS receiver.

Thus, the GPS processor 28 may be arranged to determine the GPS position of the platform supporting the GPS receiver 10 from the acquired GPS signals. That is, the GPS processor 28 determines latitude and longitude of the GPS receiver/antenna 10/16 from the acquired GPS signal. The GPS processor 28 can also determine altitude (or depth) if the GPS receiver/antenna 10/16 operates in three dimensional space. The GPS processor 28 may further determine rate and GPS system time from the acquired GPS signal.

The GPS data can be processed by the GPS processor 28 in the frequency domain instead of the time domain. Frequency domain processing techniques may involve Fast Fourier Transforms (FFT) for Wavelet Multiresolution Analysis (WMA). Software based signal acquisition is faster than hardware based signal acquisition, and software processing can eliminate much of the front end processing. However, while frequency domain techniques during signal acquisition are many times faster than conventional time domain techniques, there still will be a certain amount of time required to complete the computation required for acquisition. Thus, a delay will occur from the end of the batch data collection and the completion of the signal acquisition phase. This delay causes a problem in handover between the acquisition and tracking functions of the GPS receiver 10 because one or more of the GPS variables, such as position and/or rate, may very well change during this delay.

The problem of handover between acquisition and tracking functions caused by this delay can be accommodated by using an inertial measurement unit (IMU) 30 and a navigation processor 32 in the system processor 14. The inertial measurement unit 30 supplies inertial data to the navigation processor 32. Alternatively, an inertial navigation system (INS) can be used in place of the inertial measurement unit 30. As a further alternative, both the inertial measurement unit 30 and an inertial navigation system can be used to facilitate handing over of signal acquisition to tracking.

FIG. 2 is a flow chart illustrating a software routine 50 that can be executed by the GPS processor 28 in order to perform signal acquisition based on GPS data received with the GPS signal at the antenna 16. A block 52 starts the signal acquisition process, and a block 54 notes the start time of signal acquisition. The block 54 also notes the start navigation state as supplied by the inertial measurement unit 30 and the navigation processor 32. The navigation processor 32 computes the navigation state which typically consists of the three velocities, three positions, and three angular orientations of the platform, such as a vehicle, supporting the GPS receiver 10, but other values describing the general state of this platform can also be included. The three angular orientations are frequently stored in the form of a direction cosine matrix (DCM) typically named C. The DCM C is a 3×3 matrix from which the angular orientations can be computed. Also, the horizontal positions, typically latitude and longitude, are frequently stored in the form of a DCM named D. The DCM D is a 3×3 matrix from which the horizontal positions can be computed. The acquisition start time and the current navigation state are important for later processing as discussed below.

Once the acquisition start time and the start navigation state are noted, a block 56 initiates the collection of the batch of data that is required for signal acquisition. The block 58 performs signal acquisition by determining the code and frequency offsets from which the position of the GPS receiver/antenna 10/16 can be determined. The determination of these code and frequency offsets in the time domain are well known. The determination of these code and frequency offsets in the frequency domain are disclosed in "Comparison of Acquisition Methods for Software GPS Receiver," by David M. Lin and James B. Y. Tsui, ION-GPS 2000 conference and "Global Positioning System: Theory & Applications,"(Volumes One and Two) by Bradford W. Parkinson (Editor), James J. Spilker (Editor), James J. Spilker, Per Enge. These code and frequency offsets are handed over to the GPS signal tracking function as initial values for its tracking states. In the present invention, signal acquisition is executed in the frequency domain of the GPS RF data as indicated by FIG. 2.

Because of the time required for signal acquisition to be performed by the block 58, there is a substantial likelihood that the GPS position and rate of the GPS receiver/antenna 10/16 have changed since the beginning of the acquisition process performed by the block 58. Accordingly, a block 60 determines the changes in the code and frequency offsets as computed by the acquisition block 58. The computation of the changes in the code and frequency offsets is done simply by computing the changes in range and range rate from the GPS receiver/antenna 10/16 to GPS satellite between the start of acquisition and the completion of acquisition. The block 60 uses the start time noted by the block 54 and the current time to determine the time that has elapsed since the start of signal acquisition. The block 60 uses the elapsed time as well as the start navigation state noted by the block 54 and the end navigation state at the end of signal acquisition in order to compute the changes in position and rate from the time at which signal acquisition is completed by the block 58.

As discussed above, in propagating the position and rate solution of the GPS receiver 10 forward in time by an amount of time equal to the delay, the block 60 uses data from the inertial measurement unit 30. The navigation processor 32 uses the data from the inertial measurement unit 30 to calculate the start navigation state (position and rate) at the beginning of signal acquisition and the end navigation state at the end of signal acquisition, and the block 60 uses these start and end navigation states to propagate the position and rate solution for the GPS receiver 10 from the block 58 forward in time.

The navigation processor 32 can use classic navigation equations to compute the navigation states (position and rate). Vehicular angular velocity and vehicle non-gravitational acceleration are the inputs from the inertial measurement unit 30.

These equations are given as follows:

$$\dot{C} = C\{\overline{\omega}^B\} - \{\overline{\rho} + \overline{\Omega}\}C$$

$$\dot{\overline{v}} = C\overline{A}^B - \{2\overline{\Omega} + \overline{\rho}\}\overline{v} + \overline{g}$$

$$\dot{D} = D\{\overline{\rho}\}$$

where
C=transformation matrix from the body (or platform) to the local vertical frame
D=transformation matrix from the local-vertical frame to the Earth reference frame
$\overline{v}$=vehicle velocity relative to the Earth
$\overline{g}$=plumb-bob gravity vector
$\overline{\Omega}$=Earth's angular velocity relative to an inertial frame
$\overline{\rho}$=angular velocity of the local-vertical frame relative to the Earth
$\overline{\omega}^B$=vehicle angular velocity relative to an inertial frame (in body axes)
$\overline{A}^B$=vehicle nongravitational acceleration (in body axes)
$\overline{A}$=vehicle nongravitational acceleration (in local-vertical axes)
$\dot{x}$=skew-symmetric realization of the vector x.

It is noted that all vectors (except $\overline{\omega}^B$ and $\overline{A}^B$) are expressed with components in the local-vertical frame. As discussed above, the angular orientations are computed from the matrix C, and the horizontal positions, typically latitude and longitude, are computed from the matrix D. These computations are well known.

The navigation processor 32 uses these equations to calculate the start navigation state (position and rate) at the beginning of signal acquisition, and the navigation processor 32 also uses these equations to calculate the end navigation state (position and rate) at the end of signal acquisition. These two navigation states determine the change in the NAV solution between the beginning of signal acquisition and the end of signal acquisition The navigation processor 32 may also use other aids in addition to the inertial measurement unit 30 to compute its navigation solution. Other typical aids include radar or barometric altimeter, Doppler radar, and even GPS. Of course, during the acquisition phase being addressed by the present invention, the GPS receiver 10 will not have any measurements available to provide to the navigation processor.

Based on this change in NAV solution, a block 62 computes the updated code offset from the change in position of the GPS receiver 10 between the last pass through the software routine 50 and the current pass through the software routine 50, and a block 64 computes the updated frequency offset from the change in rate between the last pass through the software routine 50 and the current pass through the software routine 50.

The updated code and frequency offsets to be handed to the tracking function can be computed based on the equations below. First, certain quantities are defined as follows:

SVPb: SV position at the beginning of acquisition as computed with almanac data typically computed in Earth Centered Earth Fixed (ECEF) coordinates SVPe: SV position at the end of acquisition as computed with almanac data typically computed in Earth Centered Earth Fixed (ECEF) coordinates Xb: user position at the beginning of acquisition typically computed in Earth Centered Earth Fixed (ECEF) coordinates Xe: user position at the end of acquisition typically computed in Earth Centered Earth Fixed (ECEF) coordinates dr: change in range between the GPS receiver/antenna 10/16 and the satellite during the signal acquisition phase=mag(SVPe−Xe)−mag(SVPb−Xb)

SVVb: SV velocity at the beginning of acquisition as computed with almanac data typically computed in Earth Centered Earth Fixed (ECEF) coordinates SVVe: SV velocity at the end of acquisition as computed with almanac data typically computed in Earth Centered Earth Fixed (ECEF) coordinates Vb: user velocity at the beginning of acquisition typically computed in Earth Centered Earth Fixed (ECEF) coordinates Ve: user velocity at the end of acquisition typically computed in Earth Centered Earth Fixed (ECEF) coordinates dv: change in range rate between the GPS receiver/antenna 10/16 and the satellite during the signal acquisition phase=mag(SVVe−Ve)−mag(SVVb−Vb)

co_original: code offset computed by acquisition co_updated: the updated code offset value to be handed to the tracking function fo_original: frequency offset computed by acquisition fo_updated: the updated frequency offset value to be handed to the tracking function chipping_rate: the number of chips per meter that the tracking loop uses for its code generation lambda: the wavelength of the GPS signal being tracked (the carrier frequency wavelength)

Then the updated code and frequency offsets can be calculated as by the following equations:

co_updated=co_original+$dr$*chipping_rate.

fo_updated=fo_original+$dv$/lambda.

It is noted that the SV position and velocities, which are required to compute dr and dv, are normally computed by the GPS receiver based on almanac data and are therefore available.

Finally, a block 66 hands over the updated frequency and code offsets to the tracking function that is conventionally performed by GPS receivers.

Thus, the outputs of the GPS signal acquisition represented by the software routine 50 are updated code and frequency offsets for each satellite. The inertial data from the inertial measurement unit 30 can be used to propagate the position and rate solution forward from batch data collection to the current time. These propagated solutions can then be used to initialize the tracking function.

Certain modifications of the present invention will occur to those practicing in the art of the present invention. For example, as shown above, the GPS front end 12 includes the frequency downconverter 22 and such bandpass filters as are desirable. However, operations of the frequency downconverter 22 and/or bandpass filters instead may be executed in software by the system processor 14.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

We claim:

1. A method performed by a GPS receiver of processing GPS data comprising:
   acquiring GPS data from at least one GPS satellite, wherein the GPS data is useful in determining GPS position of the GPS receiver;
   performing acquisition functions in the frequency domain based on the GPS data, wherein the acquisition functions produce acquisition results, and wherein the performing of the acquisition functions cause a delay in handing over the acquisition results to a tracking function;
   propagating the acquisition results forward in time by an amount of time substantially equal to the delay; and,
   handing over the propagated acquisition results to the tracking function.

2. The method of claim 1 wherein the propagating of the acquisition results forward in time comprises propagating the acquisition results forward in time according to inertial navigation data.

3. The method of claim 2 further comprising providing the inertial navigation data to the GPS receiver from an inertial measurement unit.

4. The method of claim 2 further comprising providing the inertial navigation data to the GPS receiver from an inertial navigation system.

5. The method of claim 1 wherein the handing over of the propagated acquisition results to the tracking function comprises:
   determining an updated code offset and an updated frequency offset based on the propagated acquisition results;
   handing over the updated code offset and the updated frequency offset change to the tracking function.

6. The method of claim 5 wherein the propagating of the acquisition results forward in time comprises propagating the acquisition results forward in time according to inertial navigation data.

7. The method of claim 6 further comprising providing the inertial navigation data to the GPS receiver from an inertial measurement unit.

8. The method of claim 6 further comprising providing the inertial navigation data to the GPS receiver from an inertial navigation system.

9. The method of claim 5 wherein the propagated acquisition results include a GPS position and rate of the GPS receiver, wherein the determining of an updated code offset comprises determining the updated code offset based upon a change between the GPS position at the end of the performing of the acquisition functions and a GPS position at the start of the performing of the acquisition functions, and wherein the determining of an updated frequency offset comprises determining the updated frequency offset based upon a change between the rate at the end of the performing of the acquisition functions and a rate at the start of the performing of the acquisition functions.

10. The method of claim 1 wherein the propagated acquisition results include a GPS position and rate of the GPS receiver.

11. The method of claim 1 wherein the performing of acquisition functions comprises performing the acquisition functions in software.

12. The method of claims 1 wherein the acquisition functions include frequency downconvers ion.

13. A method performed by a GPS receiver of processing GPS data comprising:
   a) acquiring GPS data from at least one GPS satellite;
   b) determining a code offset based on the acquired GPS data;
   c) determining a frequency offset based on the acquired GPS data;
   d) determining a change in GPS position of the GPS receiver during the determination of the code offset;
   e) determining a change in rate of the GPS receiver during the determination of the frequency offset;
   f) determining an updated code offset based on the code offset determined at b) and the change in GPS position;
   g) determining an updated frequency offset based on the frequency offset determined at c) and the change in rate; and,
   h) handing over the updated code offset and the updated frequency offset to a tracking function.

14. The method of claim 13 wherein the change in GPS position and the change in rate are determined in accordance with inertial navigation data.

15. The method of claim 14 further comprising providing the inertial navigation data to the GPS receiver from an inertial measurement unit.

16. The method of claim 14 further comprising providing the inertial navigation data to the GPS receiver from an inertial navigation system.

17. The method of claim 13 wherein the acquiring of GPS data comprises downconverting the GPS data.

18. The method of claim 17 wherein the downconverting of the GPS data comprises downconverting the GPS data in the frequency domain.

19. The method of claim 13 wherein the determining of a code offset comprises determining the code offset in the frequency domain, and wherein the determining of a frequency offset comprises determining the frequency offset in the frequency domain.

20. The method of claim 19 wherein the acquiring of GPS data comprises downconverting the GPS data.

21. The method of claim 20 wherein the downconverting of the GPS data comprises downconverting the GPS data in the frequency domain.

22. A method performed by a GPS receiver of processing GPS data comprising:
    downconverting and sampling a GPS signal from at least one GPS satellite to produce digital GPS data;
    determining parameters related to position and rate of the GPS receiver from the digital GPS data;
    determining a change in the position and rate of the GPS receiver between a start of the determination of the parameters and an end of the determination of the parameters;
    updating the parameters in accordance with the change in the position and rate; and,
    handing over the updated parameters to a tracking function.

23. The method of claim 22 wherein the determining of a change in the position and rate of the GPS receiver comprises determining a change in the position and rate of the GPS receiver according to inertial data.

24. The method of claim 23 further comprising providing the inertial data to the GPS receiver from an inertial measurement unit.

25. The method of claim 23 further comprising providing the inertial data to the GPS receiver from an inertial navigation system.

26. The method of claim 22 wherein the determining of parameters related to position and rate of the GPS receiver comprises:
    determining a code offset based on position; and,
    determining a frequency offset based on rate.

27. The method of claim 26 wherein the updating of the parameters in accordance with the change in the position and rate comprises:
    determining an updated code offset based on the change in the position; and,
    determining an updated frequency offset based on the change in the rate.

28. The method of claim 27 wherein the handing over of the updated parameters to a tracking function comprises handing over the updated code offset and the updated frequency offset to the tracking function.

29. The method of claim 28 wherein the determining of an updated code offset comprises determining the updated code offset according to inertial navigation data, and wherein the determining of an updated frequency offset comprises determining the updated frequency offset according to the inertial navigation data.

30. The method of claim 29 further comprising providing the inertial data to the GPS receiver from an inertial measurement unit.

31. The method of claim 29 further comprising providing the inertial data to the GPS receiver from an inertial navigation system.

32. The method of claim 22 wherein the determining of parameters related to position and rate of the GPS receiver comprises determining the parameters in the frequency domain.

* * * * *